United States Patent [19]

McDonald

[11] 4,006,932
[45] Feb. 8, 1977

[54] INFLATABLE DRAG REDUCER FOR LAND VEHICLES

[75] Inventor: Alan T. McDonald, West Lafayette, Ind.

[73] Assignee: The United States of America as represented by the Secretary of the Department of Transportation, Washington, D.C.

[22] Filed: July 21, 1975

[21] Appl. No.: 597,557

[52] U.S. Cl. .................................. 296/1 S; 105/2 R
[51] Int. Cl.² ...................................... B62D 35/00
[58] Field of Search .............. 296/1 S, 91; 105/2 R, 105/2 A, 2 B

[56] References Cited
UNITED STATES PATENTS

| | | | |
|---|---|---|---|
| 2,725,944 | 12/1955 | Lee | 296/1 S |
| 2,737,411 | 3/1956 | Potter | 296/1 S |
| 3,834,752 | 9/1974 | Cook | 296/1 S |

Primary Examiner—Robert R. Song
Assistant Examiner—John A. Carroll
Attorney, Agent, or Firm—Herbert E. Farmer; Harold P. Deeley, Jr.

[57] ABSTRACT

A transport vehicle with a front end that leads the vehicle during normal movement thereof and a substantially planar surfaced rear end that trails the vehicle during such movement. Mounted on the rear end is an inflatable enclosure that when inflated possesses convergent contoured surfaces that extend from the edges of the rear end's planar surface. An inflation mechanism is operable by a driver of the vehicle to inflate the enclosure and thereby reduce the effects of base drag during relatively high speed movement of the vehicle. Also operable by the driver is a deflation mechanism that can be operated to deflate the enclosure into a stowed position when the vehicle is not in use or operating at low speeds in confined areas.

7 Claims, 3 Drawing Figures

U.S. Patent    Feb. 8, 1977    4,006,932
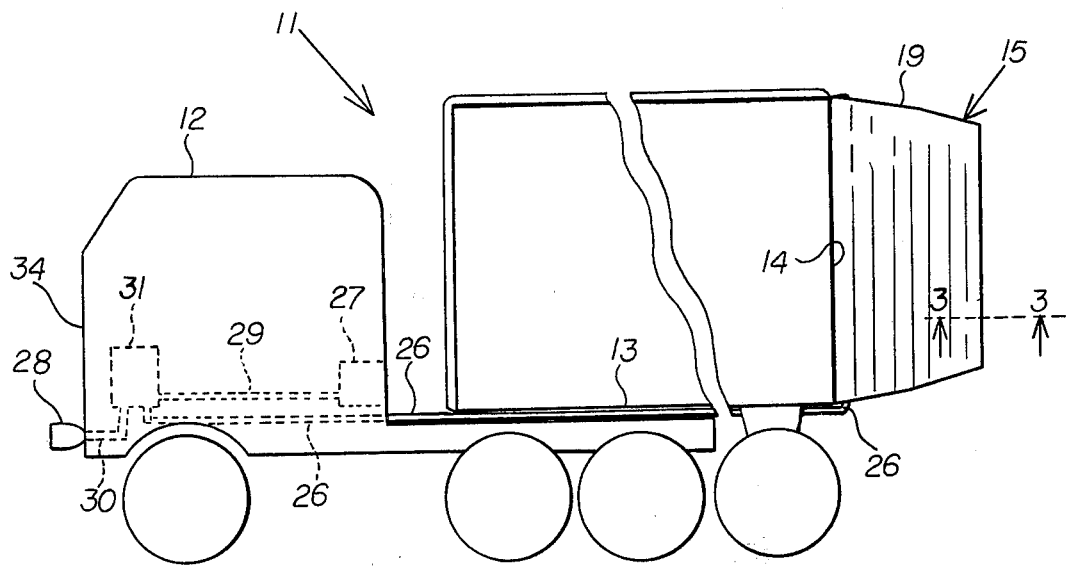
FIG. 1
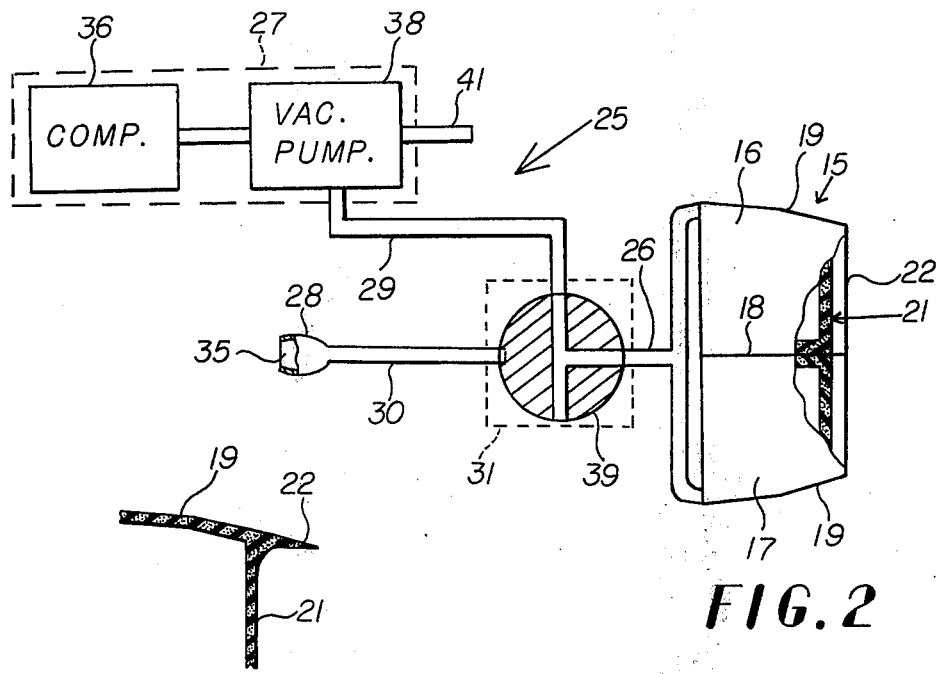
FIG. 2
FIG. 3

INFLATABLE DRAG REDUCER FOR LAND VEHICLES

BACKGROUND OF THE INVENTION

This invention relates to inflatable drag reducers for land vehicles and, more particularly, to inflatable bags for specifically reducing base drag on land vehicles.

At cruising speeds a great deal of energy is expended to overcome the aerodynamic drag of land-borne transport vehicles. Until recently the solution to this problem for highway vehicles was to install more powerful engines which used more fuel. The recent steep escalation of energy costs has made this approach less desirable. Conversely, reduced aerodynamic drag offers worthwhile savings in propulsion energy. In addition to energy savings, reduced aerodynamic drag will also reduce aerodynamic disturbance to other vehicles, improving operating safety; minimize buffeting, sidesway, and tire wear, reducing costs; and reduce formation of splash and spray during operation on wet pavement, again with safety benefits.

The ideal shape for low aerodynamic drag is a streamlined or teardrop shape like an airplane wing. Most transport vehicles have evolved from rather slow moving conveyances. Therefore, aerodynamic drag was not an important design consideration compared to structural strength and interior cargo volume. Commercial vehicles are also subject to legal and right-of-way limits on overall dimensions and weight. For these reasons, a fully "streamlined" vehicle has not been considered practical or feasible, and basic box shapes have been accepted.

The drag of a basic transport vehicle can be reduced by making the box shape appear aerodynamically more streamlined. Typically, the total aerodynamic drag on a van-type transport vehicle is composed of about 70% forebody drag, about 20% base drag and about 10% skin friction drag.

Forebody drag, caused by flow separation about the sharp corners and projections near the front of a boxy vehicle, is the largest component of drag. Since a fully-streamlined nose is impractical for size and weight reasons, effort has been concentrated toward add-on or auxiliary devices designed to provide smoother flow over the front of the vehicle. Some useful devices have appeared that are low in cost, light in weight and that do not increase the overall dimensions of a vehicle. Such devices can provide reductions in aerodynamic forebody drag of up to 20%. However, it appears unlikely that any significant additional reduction in forebody drag could be achieved by using add-on devices. Larger reductions in forebody drag can be attained with modifications to vehicle design that result in a more streamlined configuration, but they must be included at the factory.

Given such reductions in forebody drag, base drag which results from the low pressure separated wake behind a vehicle becomes an important contributor to the total aerodynamic drag. However, existing drag reduction schemes have ignored base drag and been designed to reduce only the forebody component of aerodynamic drag. Thus, they cannot achieve the maximum reduction attainable under no-wind conditions by methods that affect base drag as well.

The object of this invention, therefore, is to provide an efficient system for reducing base drag on conventionally constructed transport vehicles.

SUMMARY OF THE INVENTION

The invention is a transport vehicle with a front end that leads the vehicle during normal movement thereof and a substantially planar surfaced rear end that trails the vehicle during such movement. Mounted on the rear end is an inflatable enclosure that when inflated possesses convergent contoured surfaces that extend from the edges of the rear end's planar surface. An inflation mechanism is operable by a driver of the vehicle to inflate the enclosure and thereby reduce the effects of base drag during relatively high speed movement of the vehicle. Also operable by the driver is a deflation mechanism that can be operated to deflate the enclosure into a stowed position when the vehicle is not in use or operating at low speeds in confined areas.

In a described embodiment of the invention the contoured surfaces comprises cusp portions that project rearwardly from the periphery of a flat rear surface of the enclosure. Preferably the rear surface of the enclosure is spaced between five and eight feet from the planar rear surface of the vehicle and has an area of between 50 and 70% thereof. The inflation system described consists on an air inlet orifice mounted on the front end of the vehicle and opening forwardly thereof so as to receive the stagnation pressure existing in front of the vehicle during movement thereof. The air inlet orifice is connected by tubing to the enclosure through a control valve operable by the driver of the vehicle when inflation of the enclosure is desired.

DESCRIPTION OF THE DRAWINGS

These and other objects and features of the present invention will become more apparent upon a perusal of the following description taken in conjunction with the accompanying drawings wherein:

FIG. 1 is a schematic side view of a transport vehicle according to the invention;

FIG. 2 is a schematic block diagram of an inflation deflation control system for the vehicle shown in FIG. 1 and including a top view of the inflatable enclosure; and FIG. 3 is a cross-sectional view taken along lines 3—3 of FIG. 1.

DESCRIPTION OF THE PREFERRED EMBODIMENT

Illustrated in FIG. 1 is a transport vehicle 11 including a tractor 12 and a trailer 13. The rear end of the vehicle 11 is a planar surface 14 to which is secured an inflatable enclosure 15. As schematically illustrated in FIG. 2, the enclosure 15 preferably comprises a pair of inflatable bags 16 and 17 each connected to one of a pair of doors that form the planar surface 14.

As shown in FIG. 2, the directly adjacent inflated bags 16 and 17 engage along adjacent interior surfaces 18 and have contoured top, bottom and side surfaces 19 that converge rearwardly and are tangent to the top, bottom and side surfaces of the trailer 13. The contoured surfaces 19 join aligned back walls that from a flat surface 21 as shown in the partially cutaway view in FIG. 2. Extending rearwardly from the periphery of the surface 21 are cusp portions 22 on all of the contoured surfaces 19. Preferably the contoured surfaces 19 have smooth contours of approximately 12-foot radius and the flat surface 21 is spaced from the planar surface 14 of the vehicle 11 by between five and eight feet and has an area of between 50 and 70% thereof.

As schematically shown in FIGS. 1 and 2, the vehicle includes an inflation-deflation system 25 that communicates with the bags 16 and 17 via air supply tubing 26. Included in the system 25 are a deflation unit 27 and an inflation unit 28 connected by supply pipes 29 and 30, respectively, to a control console 31 accessible to a driver of the tractor 12. The inflation unit 28 is a nozzle mounted on a front end 34 of the vehicle 11 and with an inlet orifice (FIG. 2) opening forwardly. Forming the deflation unit 27 is an air compressor 36 that supplies compressed air through a tube 37 to an aspirator or vacuum pump 38 having an inlet connected to the tube 29. The control console 31 possesses a three-way valve 39 that can be manipulated to either close the supply tube 26 or connect it for air communication with either the inflation unit 28 or the deflation unit 27.

At any time during operation of the vehicle 11 a driver can elect to reduce base drag by inflating the bags 16 and 17 which substantially reduce the wake size at the base of the trailer 13 and thereby effectively minimize base drag. In addition the cusp portions 22 on the enclosure 15 create recirculating air flow patterns that reduce the buffeting that will be experienced by motorists traveling in the wake of the trailer 13. Inflation of the bags 16 and 17 is accomplished by manipulating the valve 39 to provide air communication to the inlet orifice 35 of the nozzle 28. Since the bags 16 and 17 are surrounded by the less than atmospheric pressure behind the vehicle 11, the stagnation pressure at the orifice 35 supplies air flow through the valve 39 and the supply tube 26 to the bags 16 and 17. The force available for inflation if $F=(P_s-P_b)A_b$; where $P_s$ equals stagnation pressure, $P_b$ equals base pressure, and $A_b$ equals the area of the bags 16 and 17. For speeds of about 55 mph, the available force is approximately 350 pounds which is more than adequate for inflation.

When the vehicle 11 is operating at low speeds or in confined areas the bags 16 and 17 can be stowed by merely manipulating the valve 39 to provide communication between the delflation system 27 and the enclosure 15. Air flow from the compressor 36 operates the aspirator or vacuum pump 38 which produces a reduced pressure in the evacuation pipe 29. Consequently, air is drawn from the bags 16 and 17 and discharged through the outlet 41 until the bags are fully deflated.

Obviously, many modifications and variations of the present invention are possible in light of the above teachings. For example, although the described apparatus deals only with base drag, it will be obvious that the teachings herein can be combined with known systems for reducing both forebody drag and drag rise due to crossflow. It is to be understood, therefore, that the invention can be practiced otherwise than as specifically described.

What is claimed is:

1. A vehicle comprising:
   a front end that leads said vehicle during normal movement thereof;
   a rear end with a substantially planar surface that trails said vehicle during normal movement thereof;
   an inflatable enclosure secured to said rear end, said enclosure when inflated having convergent contoured surfaces extending from the edges of said planar surface and further comprises a substantially flat rear surface spaced from said planar surface and connected to said contoured surfaces; wherein said contoured surfaces comprise cusp portions that project rearwardly from the periphery of said flat rear surface;
   inflation means for inflating said enclosure; and
   deflation means for deflating said enclosure.

2. A vehicle according to claim 1 wherein said flat rear surface is spaced between five and eight feet from said planar surface and has an area of between 50 and 70% thereof.

3. A vehicle according to claim 1, wherein said inflation means comprises air supply means responsive to the air pressure generated aerodynamically from vehicle motion including tube means extending between said enclosure and an air inlet orifice mounted on said front end and opening forwardly.

4. A vehicle according to claim 3 wherein said air supply means comprises valve means for controlling automatically said aerodynamically generated air flow through said tube means and disposed for operation by a driver of said vehicle.

5. A vehicle according to claim 4 wherein said deflation means comprises aspirator pump means for evacuating said enclosure.

6. A vehicle according to claim 1 wherein said inflated enclosure comprises a pair of inflatable enclosures each connected to one of a pair of doors that form said planar surface, each of said inflated enclosures comprises a substantially flat rear surface spaced from said planar surface and connected to said contoured surfaces.

7. A vehicle according to claim 6 wherein said contoured surfaces comprise cusp portions that project rearwardly from the periphery of said flat rear surface.

* * * * *